April 21, 1959
C. H. BUTCHER, JR
2,882,886
HOLLOW STEM POPPET VALVE
Filed Aug. 16, 1956
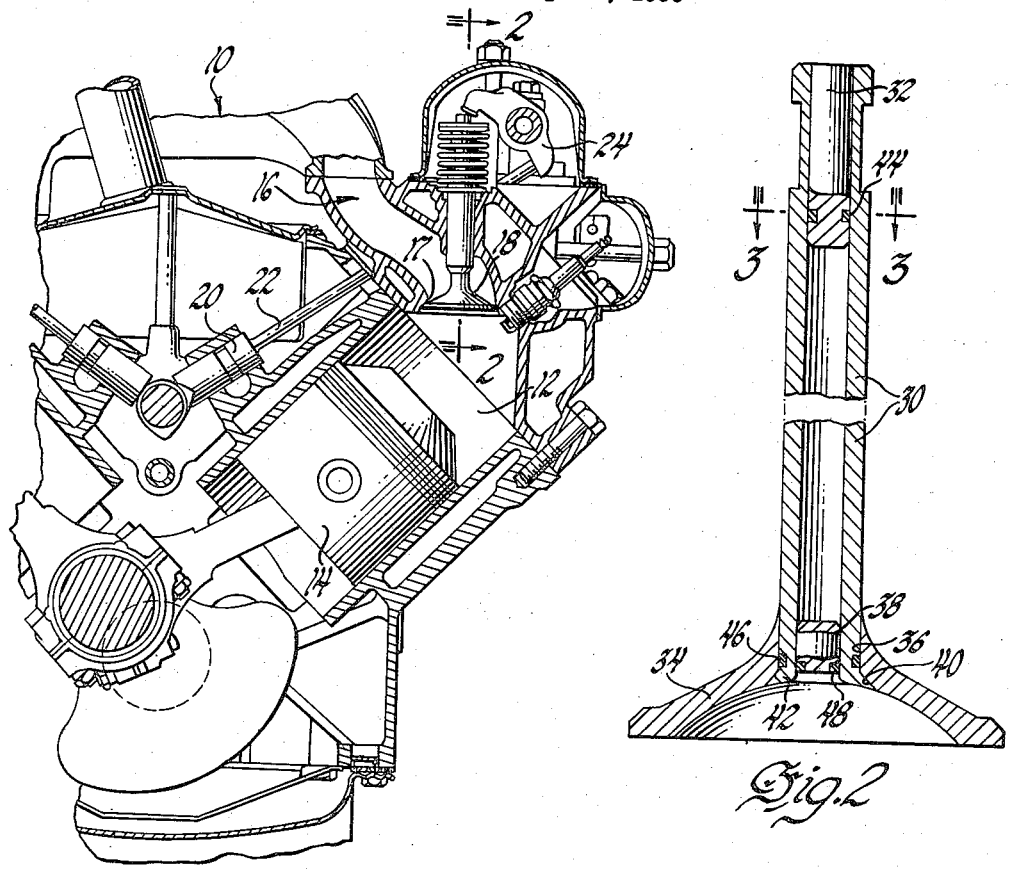
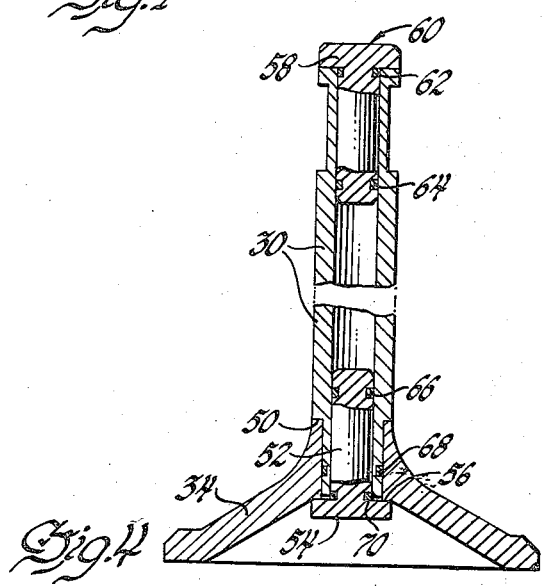
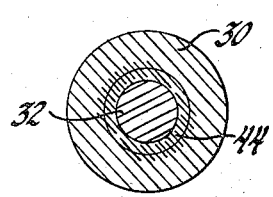
INVENTOR
Charles H. Butcher, Jr.
BY
L. D. Burch
ATTORNEY

United States Patent Office 2,882,886
Patented Apr. 21, 1959

2,882,886

HOLLOW STEM POPPET VALVE

Charles H. Butcher, Jr., Toledo, Ohio, assignor to General Motors Corporation, Detroit, Mich., a corporation of Delaware Application August 16, 1956, Serial No. 604,457

6 Claims. (Cl. 123—188)

This invention relates to valves for internal combustion engines.

Objects of the invention include the production of a light weight valve and new methods of manufacturing such valves. Other objects will become apparent from the following description.

It has been known for some time that hydraulic lifters used in valve actuation mechanisms of internal combustion engines have a phenomenon known as hydraulic lifter "pump-up." This phenomenon results when the hydraulic lifter takes up lash in the valve gear which is induced by excessive valve spring surge at high engine speed. The result is that the valve is held off the valve seat and accompanied by a considerable loss in engine power and possible damage to the engine. When a light weight valve is used, it allows a higher lifter "pump-up" speed than a valve of heavier weight, thus extending the operating speed range of the engine. It is proposed to manufacture a light weight valve for use with hydraulic valve lifters in order to reduce the occurrence of "pump-up."

In the accompanying drawing Fig. 1 is a vertical sectional broken view of a portion of an internal combustion engine having an inlet valve disposed in the inlet port and embracing the invention herein disclosed.

Fig. 2 is a vertical sectional view of the valve shown in Fig. 1 and taken on line 2—2.

Fig. 3 is a cross section view taken on lines 3—3 of Fig. 2.

Fig. 4 shows a modified form of the valve shown in the above figures.

Internal combustion engine 10 has a cylinder 12 with a piston 14 mounted therein for reciprocation. Inlet passage 16 is provided to conduct fuel and air mixtures to the cylinder for combustion. This passage is opened and closed at port 17 by valve 18 which is actuated by hydraulic lifter 20 through push rod 22 and rocker arm 24. Details of the valve are shown in the cross section view of Fig. 2.

The valve stem includes a hollow tube 30 having a cap end plug 32 inserted in the tube end nearest the rocker arm 24. The port closure or head 34 of the valve has a central bore 36 through which the tube 30 extends. A head end plug 38 closes off the head end of tube 30. Plug 38 may be so dimensioned relative to the internal diameter of tube 30 that when it is inserted into position it tends to expand tube 30 radially outward, causing a tighter engagement between head 34 and tube 30 along the surface of bore 36.

An annular tapered recess 40 on the combustion chamber side of head 34 is provided in order that the head end of tube 30 may be upset as shown at 42 to enlarge the end of the tube and engage the recess. Copper braze rings 44, 46 and 48 are seated in annular grooves in the plugs 32 and 38 and an annular groove around the head end of stem 30 immediately adjacent the upset portion 42. These copper rings allow the assembled pieces to be brazed into an integral structure, as shown in Fig. 3.

Figure 4 shows a modification of the valve of Fig. 2. Stem or tube 30 has a shoulder 50 adjacent one end against which the valve head 34 abuts and provides an axial locating and securing surface for the head. The head end plug 52 has a head 54 formed thereon and extending from the head end of the tube when the plug is inserted in place. Plug 52 may be dimensioned to provide a press fit within tube 30. If so dimensioned, it will, when inserted, tend to expand tube 30 radially outwardly, causing a more firm engagement between tube 30 and head 52. Plug head 54 also abuts a coplanar annular surface 56 formed on the combustion chamber side of valve head 34. This arrangement provides a positive lock for valve head 34 in both axial directions relative to tube 30. A similar end plug 58 may be used to provide an end cap surface 60 which is in contact with rocker arm 24 when the valve is assembled in an engine. Copper brazed rings 62, 64, 66, 68 and 70 may also be used to braze the assembled pieces into an integral structure.

It is understood that either type of end plug is interchangeable and may be used in either modification.

A light weight valve of compact and economical construction has thus been provided which will give excellent performance in combination with hydraulic valve lifters and allow the engine to be operated at higher speeds than previously attainable before lifter "pump-up" takes place.

What is claimed is:

1. An internal combustion engine valve adapted for hydraulic valve lifter actuation, comprising a hollow stem, a valve head mounted thereon, and plugs in each end of said stem, said stem being flared at its head end whereby said valve head is secured in place.

2. A valve adapted for use in internal combustion engines and having a hollow stem, a shoulder formed on said stem adjacent one end thereof, a valve head seated against said shoulder, a plug inserted in said end and having a shoulder thereon, said plug shoulder engaging said valve head whereby said valve head is held against said stem shoulder, and means for securing said stem, head and plug together.

3. A cylinder port controlling valve having a hollow stem and a valve head circumferentially mounted on one end thereof and including head and cap end plugs, said head end plug being pressed into the head supporting end of said stem radially interior of said valve head whereby said stem is expanded into a stressed contact relation with said valve head.

4. An internal combustion engine valve comprising a hollow tube having a reduced end forming a shoulder thereon, a generally conical valve head received on said tube reduced end and abutting said shoulder, a head and plug press fitted into said tube reduced end and therebeyond whereby said tube reduced end is expanded in said valve head, annular external grooves being formed in said plug and said tube reduced end and braze rings mounted therein and fused whereby said plug and said tube and said head are integrally joined, said plug having an enlarged outer end annularly overlaying the end of said tube and a portion of said valve head, and a cap end plug having a shank portion and an enlarged outer end abutting said tube other end, said cap end plug shank portion extending into said tube other end and having annular grooves formed therein receiving braze rings fused whereby said cap end plug and said tube are integrally joined.

5. A hollow stem valve for an internal combustion engine, said valve comprising a tubular stem, a generally conical valve head mounted on one end of said stem, and stem plugs secured in either end of said stem, one of said plugs being press fitted in the end of said stem receiving said valve head whereby said stem is expanded within said valve head, the end of said stem being outwardly flared adjacent the inner conical surface of said valve head, said plugs and said stem having annular grooves formed therein receiving braze rings, said braze rings being fused to interconnect said plugs and said stem and said valve head whereby an integral valve unit is formed.

6. A hollow stem valve for an internal combustion engine comprising a stem formed from stock tubing, a valve head having a substantially conical cross section including a substantially conical recessed surface, and plugs received in either end of said hollow stem and having braze rings secured in external grooves formed therein, said valve head being received on one end of said stem, said stem having an annular groove formed therein receiving a braze ring in engagement with said valve head and said valve stem, said braze rings being fused to interconnect said plugs and said stem and said valve head to form an integral valve unit, said plug in said valve stem adjacent said valve head being press fitted therein whereby said stem is expanded within said valve head, and means abutting said valve head recessed surface for retaining said valve head on said stem.

References Cited in the file of this patent
UNITED STATES PATENTS

| | | |
|---|---|---|
| 1,172,396 | Schlieder | Feb. 22, 1916 |
| 1,281,246 | Sturtevant | Oct. 8, 1918 |
| 2,193,088 | Charlton | Mar. 12, 1940 |
| 2,371,548 | Saffady | Mar. 13, 1945 |
| 2,407,561 | Lincoln | Sept. 10, 1946 |